United States Patent
Koike et al.

(10) Patent No.: US 10,137,547 B2
(45) Date of Patent: Nov. 27, 2018

(54) MAIN SPINDLE DEVICE FOR MACHINE TOOL

(71) Applicant: Okuma Corporation, Niwa-Gun (JP)

(72) Inventors: Issei Koike, Niwa-Gun (JP); Naoki Kawada, Tokyo (JP)

(73) Assignee: Okuma Corporation, Niwa-Gun (JP)

(*) Notice: Subject to any disclaimer, the term of this patent is extended or adjusted under 35 U.S.C. 154(b) by 0 days.

(21) Appl. No.: 15/629,928

(22) Filed: Jun. 22, 2017

(65) Prior Publication Data
US 2018/0021904 A1    Jan. 25, 2018

(30) Foreign Application Priority Data
Jul. 19, 2016  (JP) ................................. 2016-141640

(51) Int. Cl.
*F16C 27/04*    (2006.01)
*B23Q 11/00*    (2006.01)
(Continued)

(52) U.S. Cl.
CPC ............ *B23Q 11/0039* (2013.01); *B23Q 1/70* (2013.01); *B23Q 11/0032* (2013.01); *F16C 19/527* (2013.01); *F16C 27/045* (2013.01); *F16C 2229/00* (2013.01); *F16C 2233/00* (2013.01); *F16C 2322/39* (2013.01); *F16F 15/12* (2013.01); *F16F 2222/00* (2013.01); *F16F 2232/02* (2013.01)

(58) Field of Classification Search
CPC .. F16C 19/527; F16C 27/045; F16C 2229/00; F16C 2233/39; F16C 2240/70; F16J 15/12; F16F 2222/00; F16F 2232/02; B23Q 11/0039; B23Q 11/0032; B23Q 11/002; B23Q 17/00

USPC ........ 384/95, 99, 27, 290, 26; 318/569, 603; 409/79; 408/11; 82/902; 173/162.1; 704/204
See application file for complete search history.

(56) References Cited

U.S. PATENT DOCUMENTS 3,675,517 A * 7/1972 Tadayoshi .............. B23Q 1/385
318/571
4,086,517 A * 4/1978 Yamaki ................ G05B 19/186
318/39
(Continued)

FOREIGN PATENT DOCUMENTS

| JP | 05-138408 A1 | 6/1993 | |
| JP | 2012-171074 A1 | 9/2012 | |
| JP | 5337427 B2 * | 11/2013 | ............. B23Q 17/00 |

*Primary Examiner* — Marcus Charles
(74) *Attorney, Agent, or Firm* — Burr & Brown, PLLC

(57) ABSTRACT

A main spindle device for a machine tool includes a main spindle, a cushioning member, and an arithmetic unit. The cushioning member is disposed on a position where a vibration displacement of a rotator exists. The arithmetic unit uses data of a tool to be used to analyze a vibration mode in a free vibration of the rotator based on a support rigidity of a bearing, masses of respective parts of the rotator including the tool, an attenuation coefficient, and an equation of motion derived from rigidity and inertia by a rotation. An outer diameter of a sleeve positioned outside the bearing is changed such that a position of an antinode of the vibration or a position on which a vibration displacement exists in the vibration mode matches a position of the cushioning member inside the main spindle to change a preload on the bearing.

2 Claims, 2 Drawing Sheets

(51) Int. Cl.
  *F16C 19/52* (2006.01)
  *B23Q 1/70* (2006.01)
  *F16F 15/12* (2006.01)

(56) References Cited

U.S. PATENT DOCUMENTS

| | | | | |
|---|---|---|---|---|
| 6,599,066 B1* | 7/2003 | Koike | ............ | B23Q 1/70 |
| | | | | 384/469 |
| 8,950,507 B2* | 2/2015 | Schneider | ............ | B23Q 1/34 |
| | | | | 173/1 |
| 2005/0036846 A1* | 2/2005 | Kato | ............ | B23Q 1/0009 |
| | | | | 409/230 |
| 2008/0310967 A1* | 12/2008 | Franz | ............ | F04D 27/004 |
| | | | | 417/32 |
| 2011/0135415 A1* | 6/2011 | Hamaguchi | ............ | B23Q 11/0032 |
| | | | | 409/79 |
| 2012/0093603 A1* | 4/2012 | Ueno | ............ | G05B 19/404 |
| | | | | 409/79 |
| 2012/0221139 A1 | 8/2012 | Kido | | |

\* cited by examiner

MAIN SPINDLE DEVICE FOR MACHINE TOOL

BACKGROUND OF THE INVENTION

This application claims the benefit of Japanese Patent Application Number 2016-141640 filed on Jul. 19, 2016, the entirety of which is incorporated by reference.

Field of the Invention

The disclosure relates to a main spindle device for a machine tool.

Description of Related Art

In a cutting processing using a machine tool, especially a machining center, vibrations occur due to various causes. Conventionally, Japanese Patent Application Publication No. 2012-171074 proposes a method that controls a rotation speed of a main spindle to reduce or avoid the vibration when the vibration occurs during a processing. Such method sometimes fails to reduce the vibration by simply changing the rotation speed when the vibration is caused by a natural frequency of a mechanical system. Therefore, Japanese Patent Application Publication No. 5-138408 discloses an attempt that, for avoiding the vibration caused by the natural frequency of the mechanical system, a rigidity of a bearing is increased to change the natural frequency of the mechanical system, thus reducing the vibration.

In the related art, when the vibration occurs during a cutting processing, a sensor senses the vibration, and then the rigidity of the bearing is increased or the rotation speed is changed to be appropriate based on a frequency analysis of the vibration, so that the vibration is reduced. However, for both methods, the occurrence of the vibration is a precondition, and appropriate rigidity and processing condition cannot be determined before the processing. In the method that controls the rotation speed, while the rotation speed is decreased to reduce the vibration, productivity gets worse.

Therefore, it is an object of the disclosure to provide a main spindle device for a machine tool that solves problems in the above conventional main spindle device for the machine tool. The main spindle device for the machine tool of the disclosure effectively reduces vibration with a bending natural angular frequency of a main spindle that varies by a tool to be used, and is configured with a low-price.

SUMMARY OF THE INVENTION

In order to achieve the above-described object, there is provided a main spindle device for a machine tool according to a first aspect of the disclosure. The main spindle device includes a main spindle, a cushioning member, and an arithmetic unit. The main spindle may be rotatably supported inside a sleeve via a bearing (e.g. a rolling bearing). The cushioning member may be disposed on a position where a vibration displacement of a rotator exists. The arithmetic unit may be configured to use data of a tool to be used to analyze a vibration mode in a free vibration of the rotator based on a support rigidity of the bearing, masses of respective parts of the rotator including the tool, an attenuation coefficient, and an equation of motion derived from a rigidity and an inertia by a rotation. An outer diameter of the sleeve positioned outside the bearing may be changed such that a position of an antinode of the vibration or a position on which a vibration displacement exists in the vibration mode matches a position of the cushioning member inside the main spindle to change a preload on the bearing. Here, the position of an antinode of the vibration is a point where amplitude is maximized and displacement is most fluctuated With the main spindle device for the machine tool according to a second aspect of the disclosure, which is in the first aspect of the disclosure, a space may be configured to be filled with a medium for applying a pressure, and the space may be disposed between the housing and the sleeve on a proximity of installation positions of the respective bearings so as to have a dimension equal to or more than a width of the bearing, and the pressure of the medium inside the space may be adjusted to change the outer diameter of the sleeve positioned outside the bearing to control the preload on the bearing.

The main spindle device for the machine tool according to the first aspect has a considerably low-price structure where the cushioning members are disposed between the main spindle and the main spindle built-in member, and the grooves for applying the pressure are simply disposed in the housing without a special processing on the housing and peripheral parts. Then, even in such simple structure, the main spindle device is configured to calculate the bearing rigidity appropriate for reducing the vibration before the processing based on the information on the tool to be used, change the vibration mode of the main spindle, and maximally provide the vibration absorption efficiency of the vibration reducing members. Therefore, the vibration during the processing is reduced.

DETAILED DESCRIPTION OF THE INVENTION

Figure 1:
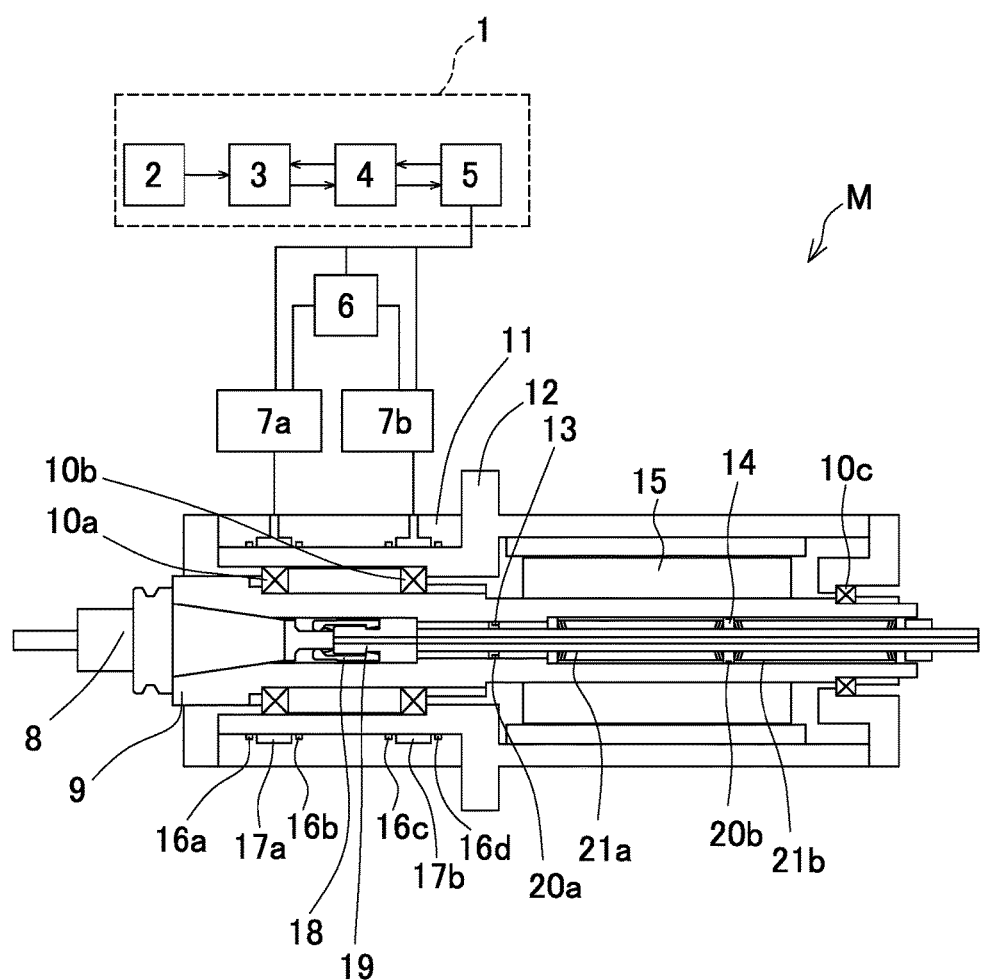
FIG. 1 is a cross-sectional view illustrating a main part of a main spindle device.

The following describes one embodiment of a main spindle device for a machine tool according to the disclosure based on the drawings in detail. FIG. 1 illustrates a main spindle device of a horizontal machining center, and a main spindle device M includes a main spindle 9, a housing 11, a sleeve 12, bearings 10a, 10b, and similar component.

A front part of the main spindle 9 is axially supported by the bearings (rolling bearings) 10a, 10b, and a rear part thereof is axially supported by a bearing (rolling bearing) 10c. The main spindle 9 extends in a front-rear direction (right-left direction in FIG. 1) of the machining center, and has a hollow cylindrical shape. Then, a collet 18, a drawbar 19, a plurality of disc springs 21, 21 . . . , and ring-shaped collars 13, 14 are inserted into an inside of the main spindle 9.

Cushioning members 20a, 20b are installed on outer peripheral surfaces of the collar 13 and the collar 14. Then, the collar 13 is embedded on a position of an antinode of vibration in a primary bending natural angular frequency of a rotator that includes the main spindle 9, a main spindle built-in member, and a rotor 15. In addition, a male thread is tapped on an outer periphery of an installation part of the collar 13 on the drawbar 19, and a female thread (screwed with the male thread) is tapped on an inner peripheral surface of the collar 13. In such configuration, the position of the collar 13 can be changed corresponding to a shape of the disc spring 21 and a whole length of the main spindle 9.

On the other hand, the collar 14 is embedded on a position of an antinode of the vibration in a primary bending natural angular frequency of the drawbar 19. On front and rear of the collar 14, the disc springs 21a, 21b are embedded, and changing combinations of the disc springs 21a, 21b allows the collar 14 to have the position freely changed. Lifting forces of the disc springs 21a, 21b are used to removably attach various tools 8 to a front end of the collet 18.

Furthermore, the sleeve 12 is embedded inside the housing 11, and grooves 17a, 17b for applying a hydraulic pressure (hydraulic pressure applying grooves) are disposed between a distal end of the housing 11 and the sleeve 12. The grooves 17a, 17b are sealed by O-rings 16a, 16b and O-rings 16c, 16d, respectively. The hydraulic pressure applied to the grooves 17a, 17b is changed so as to change shrinkage of the sleeve 12 in a radial direction, thus a preload (rigidity) on the bearings 10a, 10b can be changed.

On the other hand, a control unit 1 that controls operations is coupled to the main spindle device M. The control unit 1 includes an input device 2, an arithmetic unit 3, a storage device 4, an NC system 5, and similar component. In the storage device 4 of the control unit 1, a relation between the applied hydraulic pressure inside the grooves 17a, 17b and the preload (rigidity) on the bearings 10a, 10b is converted into data to be stored. To the NC system 5 of the control unit 1, a control valve 7a for adjusting the applied hydraulic pressure inside the groove 17a, a control valve 7b for adjusting the applied hydraulic pressure inside the groove 17b, and a hydraulic unit 6 are coupled.

The control unit 1 is configured such that, when the input device 2 is used to input dimensions of the tool 8 to be used, the arithmetic unit 3 analyzes a vibration mode of the rotator (the rotator including the main spindle 9, the main spindle built-in member, and the rotor 15). Then, the arithmetic unit 3 calculates the preload (rigidity) on the bearings 10a, 10b where a position of the antinode of the vibration or a position on which a vibration displacement exists matches the position of the cushioning member 20a. Further, the control unit 1 is configured, by using the arithmetic unit 3, to calculate the hydraulic pressure applied on an outer peripheral surface of the sleeve 12 corresponding to the required preload. Furthermore, the control unit 1 is configured to command the control valve 7 to operate the hydraulic unit 6, thus applying any hydraulic pressure. The sleeve 12 is positioned outside the bearings 10a, 10b.

Figure 2:
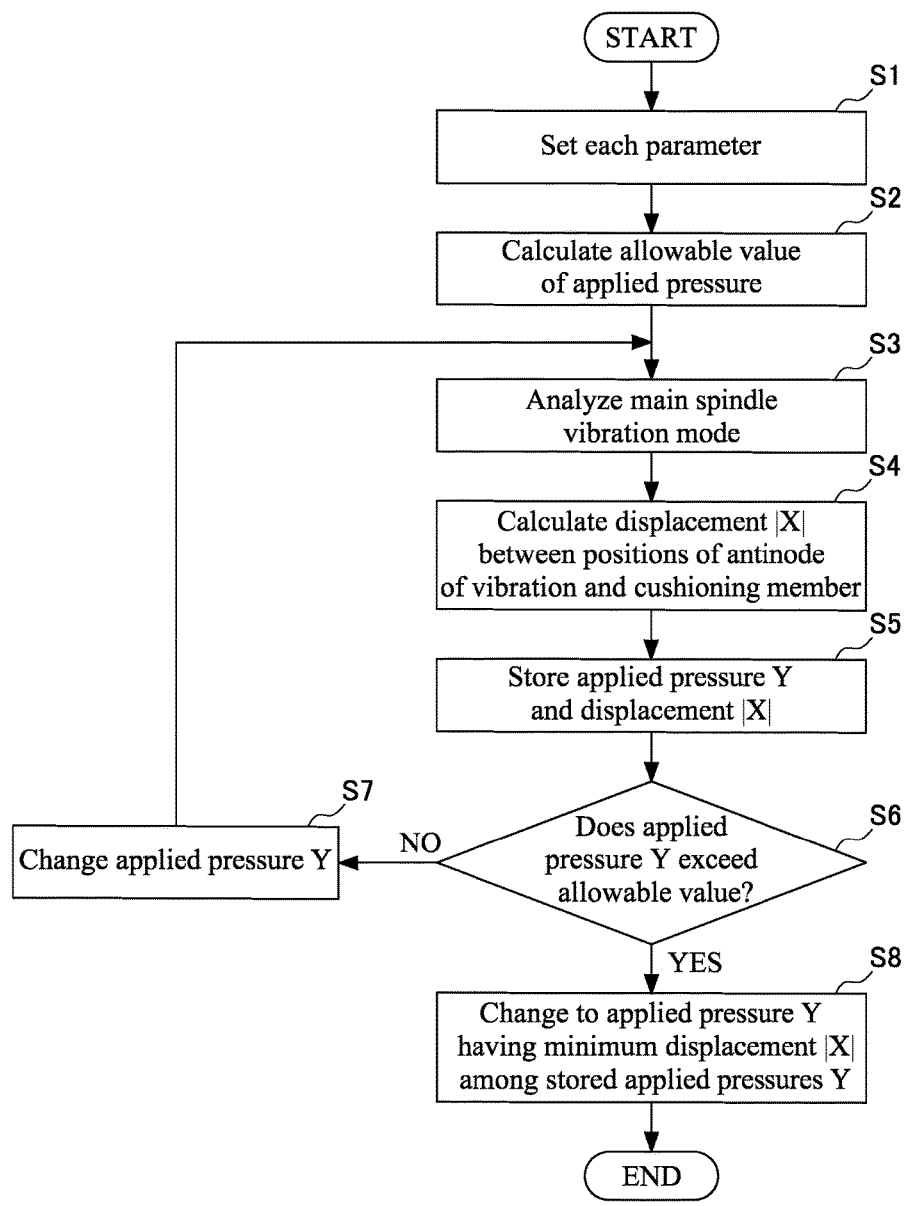
FIG. 2 is a flowchart indicating control contents of the main spindle device.

The following describes contents of an operation control on the main spindle device M based on a flowchart of FIG. 2. In the control of the operation of the main spindle device M, first, before a processing, the input device 2 sets the dimensions and a rotation speed of the tool 8 to be used for the arithmetic unit 3 at Step (hereinafter referred to as simply S) 1.

Furthermore, at S2, the arithmetic unit 3 calculates a minimum value and a maximum value of an allowable bearing rigidity of the bearings 10a, 10b based on the rotation speed set at S1, and determines a range of the allowable hydraulic pressure based on the relation between the bearing rigidity and the applied hydraulic pressure converted into data to be stored in the storage device 4. Subsequently, at S3, a main spindle system is configured (modeled) of beam elements of a plurality of cylindrical parts and bearing elements, thus analyzing the vibration mode.

Furthermore, at S4, the position of the antinode of the analyzed vibration mode is compared with the position of the cushioning member 20a, thus calculating a position displacement amount |X|. Subsequently, at S5, an applied pressure Y and the displacement amount |X| between the position of the antinode of the vibration mode and the position of the cushioning member 20a are stored in the storage device 4.

Then, at S6, the applied pressure Y used for the analysis of the vibration mode of the main spindle system is compared with the allowable applied pressure calculated at S2. When the applied pressure Y is smaller than an upper limit of the allowable value, the applied pressure Y is gradually increased and recalculations are performed until the applied pressure Y exceeds the allowable value at S7.

On the other hand, when the applied pressure Y exceeds the allowable value at S6, the process proceeds to S8, and the applied pressure Y is determined such that the stored displacement amount |X| between the position of the antinode of the vibration mode and the position of the cushioning member 20a is minimum.

The above main spindle device M has a considerably low-price structure where the cushioning members 20a, 20b are disposed between the main spindle 9 and the main spindle built-in member, and the grooves 17a, 17b for applying the pressure are simply disposed in the housing 11 without a special processing on the housing 11 and peripheral parts. However, the main spindle device M is configured to calculate the bearing rigidity (the rigidity of the bearings 10a, 10b) appropriate for reducing the vibration before the processing based on information on the tool 8 to be used, change the vibration mode of the main spindle 9, and maximally provide a vibration absorption efficiency of vibration reducing members (the cushioning members 20a, 20b), thus reducing the vibration during the processing.

The configuration of the main spindle device according to the disclosure is not limited to the aspect of the above embodiment, and the configurations of the shape and similar element of the main spindle, the bearing, the housing, the sleeve, the collar, the groove (groove for applying stress), the cushioning member, and similar component can be modified as necessary without departing from the spirit of the disclosure. For example, the main spindle device according to the disclosure is not limited to the main spindle device that employs the hydraulic pressure as means for changing the preload on the bearing as the above embodiment. The main spindle device may employ an air pressure and similar pressure, and similar main spindle device insofar as the applied pressure on the bearing is configured to be controlled.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A main spindle device for a machine tool, comprising:
a main spindle rotatably supported inside a sleeve via a bearing;
a cushioning member disposed on a position where a vibration displacement of a rotator exists; and
an arithmetic unit configured to use data of a tool to be used to analyze a vibration mode in a free vibration of the rotator based on a support rigidity of the bearing, masses of respective parts of the rotator including the tool, an attenuation coefficient, and an equation of motion derived from a rigidity and an inertia by a rotation, wherein an outer diameter of the sleeve positioned outside the bearing is changed such that a position of an antinode of the vibration or a position on which a vibration displacement exists in the vibration mode matches a position of the cushioning member inside the main spindle to change a preload on the bearing.

2. The main spindle device for the machine tool according to claim 1, wherein:

a space is configured to be filled with a medium for applying a pressure, and the space is disposed between a housing and the sleeve on a proximity of installation positions of the respective bearings so as to have a dimension equal to or more than a width of the bearing, and the pressure of the medium inside the space is adjusted to change the outer diameter of the sleeve positioned outside the bearing to control the preload on the bearing.

* * * * *